June 20, 1961

A. HUET 2,988,811

METHOD OF MAKING TUBE AND WALL CONNECTIONS

Filed Feb. 24, 1958

United States Patent Office 2,988,811
Patented June 20, 1961

2,988,811
METHOD OF MAKING TUBE AND WALL
CONNECTIONS
André Huet, 48 Ave. Du President Wilson,
Paris XVI, France
Filed Feb. 24, 1958, Ser. No. 717,089
Claims priority, application France Mar. 8, 1957
1 Claim. (Cl. 29—479)

This invention relates to tube connections.

A problem which arises very frequently in this field consists in causing a tube to traverse a metallic wall or even in fixing two sections of the tube on either side of the wall. It is generally necessary to provide joints or soldering and it frequently happens that these joints or the like are found to be defective when subjected to differences in expansion.

The present invention has for its object a method of connecting a tube to a wall which it traverses so as to overcome this disadvantage.

The method of connection according to the invention consists essentially in forming a neck or socket in the wall where the tube must traverse it, the said neck or socket having an internal diameter which is slightly larger than that of the tube. At least one, but preferably two bosses fairly close together are then formed on the tube itself. The tube thus treated is passed inside the neck or socket and the lips of the socket are then pressed down against the tube, after which the lips of the socket are welded to the upper boss on the tube.

The advantage of this connecting method is that owing to the flexibility of the inwardly bent lips of the socket, the welded joint is not subject during operation to any stress due to differences in expansion.

In a modification of the method of connection, in which modification it is not desirable that the tube itself extends through the wall, the end of the socket has formed thereon, by means of a suitably shaped tool, a double neck which is directed perpendicularly of the orifice in the socket. The two tube sections forming the pipeline passing through the wall are then welded to each of the ends of the small double neck.

The invention will be further described with reference to the accompanying drawings which are given by way of example, and in which FIG. 1 is a sectional view of the tube introduced through a socket on the wall which it must traverse.

Figure 1:
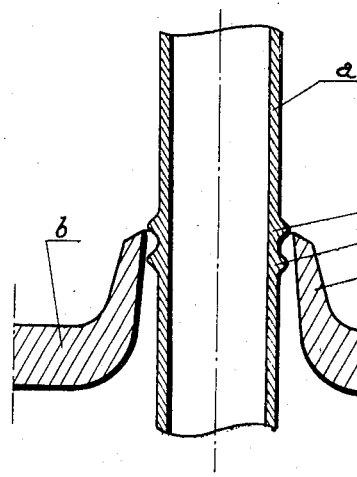
Figure 2:
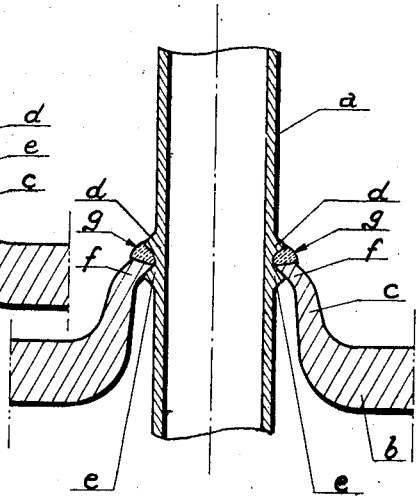
FIG. 2 is a view similar to FIG. 1 after the tube and the socket have been connected.

According to the invention, in order to connect a tube $a$ to the wall $b$ through which it must extend, a socket $c$ is initially formed in known manner on the wall $b$. In addition, at least one boss $d$, and possibly a second boss $e$ disposed below the first boss, are formed for example by compression on the tube $a$, these two bosses taking the form of two annular beads or shoulders on the tube periphery. After introducing the tube $a$ into the socket $c$, the internal diameter of which is such that it permits the free passage of the bosses $d$ and $e$, the lips of the socket $c$ are pressed down, as shown in FIG. 2, so that their ends $f$ bear against the tube $a$ and possibly rest on the lower boss $e$. It is then sufficient to solder the ends of the lips of the socket $f$ to the boss $d$, as shown at $g$ in FIG. 2, in order to have produced the connection of the tube to the wall $b$.

The advantage of this method of connection is that the soldered joint $g$ is not affected by stresses due to differences in expansion, because of the flexibility of the bent-over lips $f$ of the socket $c$.

Figure 3:
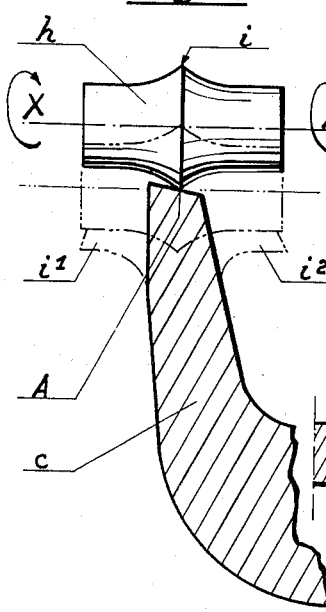
FIG. 3 is a fragmentary section to a much larger scale showing a method of forming a small double-lipped neck on the end of a socket.
Figure 4:
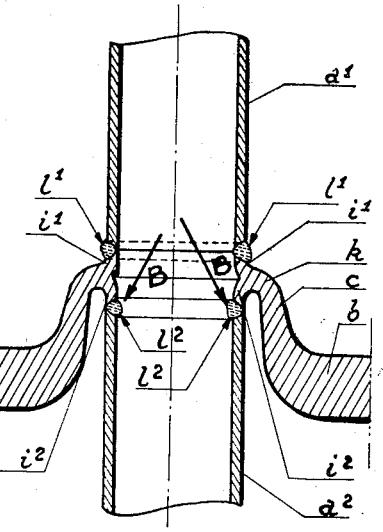
FIG. 4 shows a socket according to that in FIG. 3 and serving to secure two tube sections.

In a modification, the cutting of the lips of the socket $c$ is started by treating the lips with a tool $h$ comprising two symmetrical curves converging in a central ridge $i$, the said tool turning about its axis XX and being applied to the centre A of the lip section of the socket $c$. The tool $h$ penetrates inside the metal and causes two bent-over half lips $i^1$, $i^2$ to be formed on either side of the edge $i$, as shown in chain-dotted lines in FIG. 3. If the lips $k$ of the socket $c$ thus treated are then bent down in the manner shown in FIG. 4, there is obtained an ordinary socket $c$ terminating in a small neck having two lips $i^1$, $i^2$. It is also possible, and this is the preferred solution, to start by bending the lips of the main socket $k$ at a right-angle and, in this position, opening the end of the bent-over lip of this socket by means of the tool $h$ so as finally to obtain the shape shown in FIG. 4. It is then sufficient for the tube sections $a^1$, $a^2$ to be soldered respetcively at $l^1$, $l^2$ to the ends of the lips of the socket $i^1$, $i^2$ in order to produce the connection shown in FIG. 4 of the tube $a^1$, $a^2$ to the wall $b$. The soldered joint $l^2$ can be made inside the tube in the direction of the arrows $b$, while the soldered joint $l^1$ will be made on the outside in the ordinary way.

It is obvious that modifications as regards details could be incorporated into the embodiment of this invention without thereby departing from the scope thereof.

What I claim is:

A method for connecting a metal tube to a metal wall through which said tube is to extend which comprises the steps of forming a socket in said wall having an internal diameter greater than that of the tube and forming the lips of said socket to diminish in cross section in the direction of their free ends, compressing the tube to form on its exterior surface at least one boss having the form of an annular ring, inserting the tube in the socket and pressing the lips of the socket inwardly to bring the free ends of said lips into contact with the external wall of the tube adjacent said boss, said lips being pressed inwardly to give them an arcuate form and soldering the lips to said boss whereby to form a connection between said tube and said wall resistant to deterioration by reason of stress resulting from variations in expansion between the wall and the tube, said lips flexing to absorb said variations.

References Cited in the file of this patent
UNITED STATES PATENTS

| | | |
|---|---|---|
| 1,249,948 | Gruber | Dec. 11, 1917 |
| 1,255,469 | Schlieder | Feb. 5, 1918 |
| 2,166,890 | Desmond | July 18, 1939 |